March 30, 1965  W. D. FIEDLER  3,175,724
REMOVABLE PROTECTIVE COVER FOR OUTLET CONDUIT BOX
Filed July 5, 1962  2 Sheets-Sheet 1
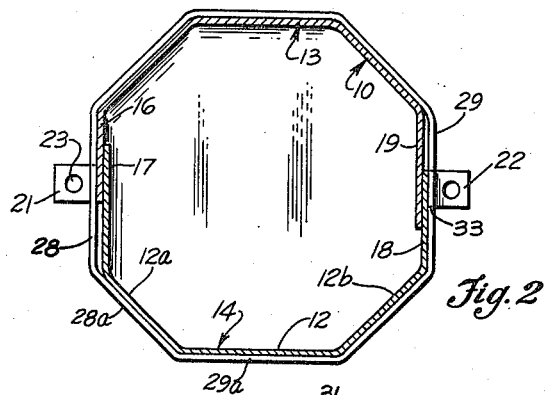
Fig. 2
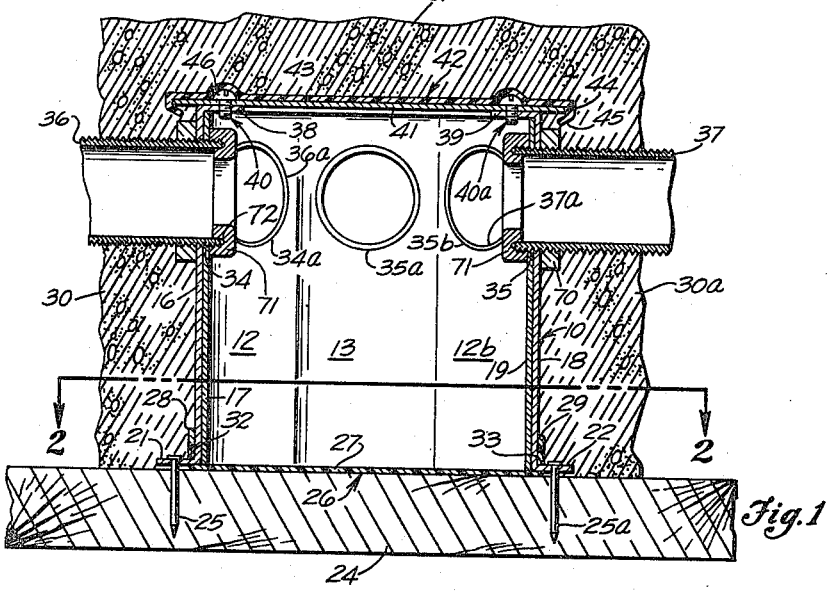
Fig. 1
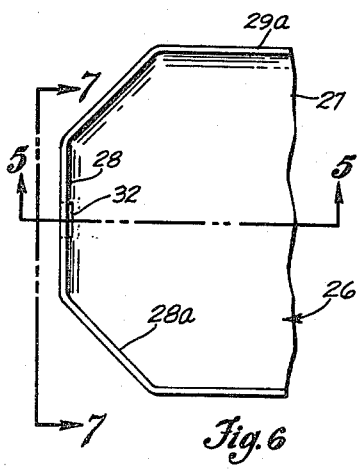
Fig. 6
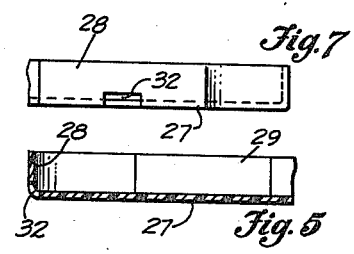
Fig. 7
Fig. 5
WILLIAM D. FIEDLER
INVENTOR.
ATTORNEY March 30, 1965  W. D. FIEDLER  3,175,724
REMOVABLE PROTECTIVE COVER FOR OUTLET CONDUIT BOX
Filed July 5, 1962  2 Sheets-Sheet 2
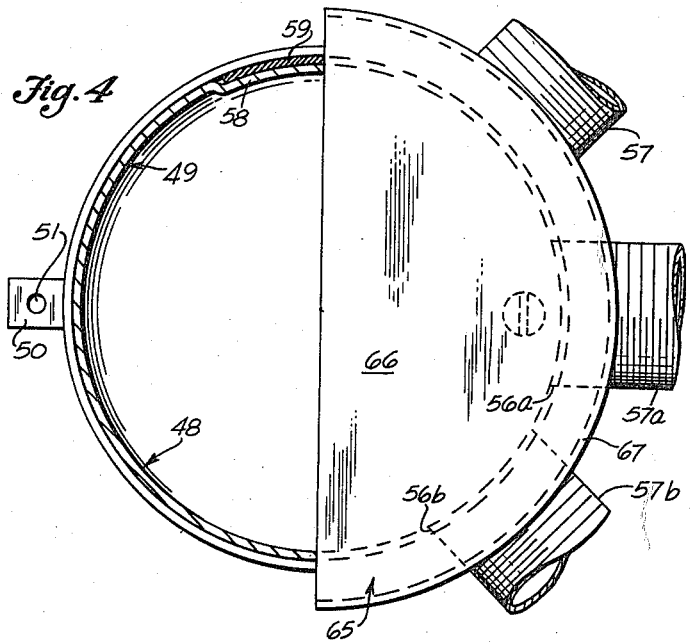
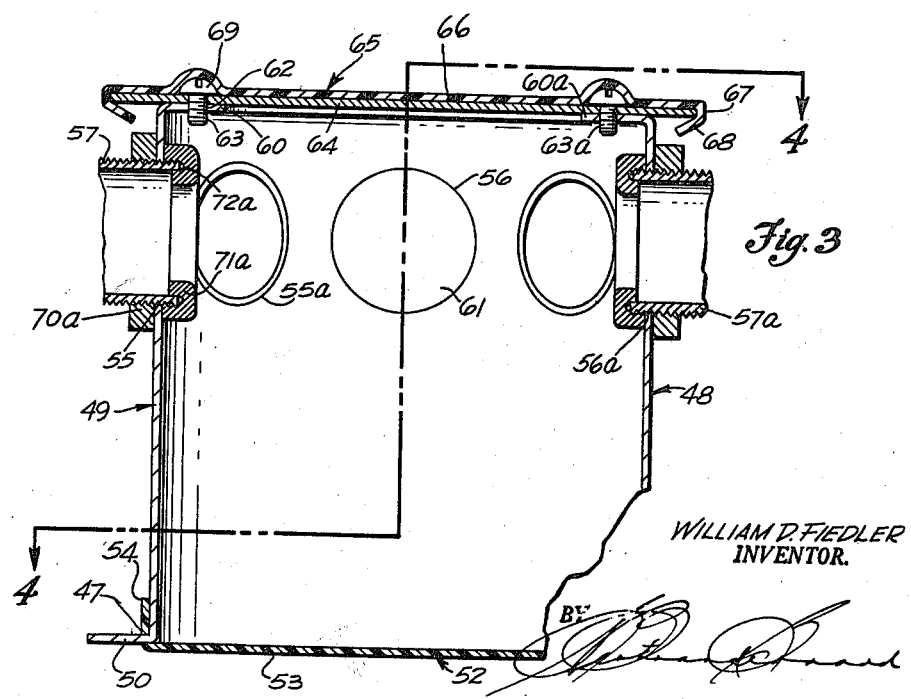
WILLIAM D. FIEDLER
INVENTOR.
BY
ATTORNEY United States Patent Office 3,175,724
Patented Mar. 30, 1965

3,175,724
REMOVABLE PROTECTIVE COVER FOR OUTLET CONDUIT BOX
William D. Fiedler, Glendale, N.Y., assignor of one-half to William H. Fiedler, Brooklyn, N.Y.
Filed July 5, 1962, Ser. No. 207,736
9 Claims. (Cl. 220—3.8)

This invention relates to electrical conduit boxes, and is particularly directed to a conduit box which is used to support a plurality of tubular electrical conduits, the conduit box and the conduits being imbedded in concrete, or other similar material, during the course of construction of a building.

It is primarily directed to a removable protective cover, which is attached to the lower open end of the outlet conduit box, to prevent the flow of fluid concrete, or other type of construction mix into the interior of the conduit box, while the concrete is poured around the outer surface of the conduit box.

In the construction of many modern buildings, tubular conduits are used to support the cables and other wires used for distributing electricity through the building.

The ends of the conduits lead into and are supported by outlet conduit boxes, which are located at junction points between sections of the conduits, the conduit boxes being utilized for connecting the wires and cables inserted through the conduits to other wires and cables used for outlets located in the general vicinity of the conduit box.

While the building is under construction, the individual conduit boxes are attached to a portion of each of the conduits, adjacent which the conduit box is mounted, after which the concrete is poured around the circumferential outer surfaces of the conduits, each conduit box, except for the open end thereof, through which the individual wires are drawn being completely imbedded in the concrete.

While the concrete is being poured around the outlet conduit box, a portion of the wet concrete mix frequently seeps in through the open end of the conduit box. After the concrete forms are removed from the concrete structures, it is necessary for the user to chop away the hardened concrete from the interior of the conduit box, and the open end thereof.

Sometimes the concrete completely covers the open end of the outlet conduit box, so that the conduit box cannot be found without considerable difficulty. It is therefore necessary to chop out the concrete in the vicinity of the individual conduit box, or to insert a new conduit box, which is extremely difficult, as it necessitates, in order to insert a new conduit box, also chopping out a large part of the concrete wall or ceiling in order to insert new conduits, after which a new conduit box is inserted to receive and support the ends of the conduits.

Even if the open end of the conduit box is visible, above the surface of the concrete, and concrete seeps into the open lower end of the conduit box during the pouring process, it is necessary to manually chop the concrete out of the interior of the conduit box, and also to manually chop out any concrete which may seep into the open ends of the conduits, which are located in the interior of the conduit box.

This is an extremely laborious operation and requires considerable skill, in order not to disturb the ends of the conduits, which are located in the interior of the conduit box.

While the length of time required to chop the hardened concrete out of the interior of the conduit box and the conduits supported thereby, coupled with the relatively high cost of experienced electricians in today's market, the overall cost of removing hardened concrete from the interior of a conduit box becomes relatively costly under any conditions.

The primary feature of applicant's construction is that a thin plastic cover is attached to the open lower end of the conduit box, the protective cover being adapted to seal the open lower end of the conduit box, and prevent the admission of concrete in fluid form into the interior of the conduit box, and into the open ends of the conduits, which are supported by the vertical outer walls of the conduit box.

After the concrete is poured and hardens around the outer surfaces of the conduit box, the flat bottom wall of the plastic cover, adjacent the inner surface of the vertical outer walls of the conduit box may be cut out, thereby exposing the interior of the conduit box, and allowing the necessary connections to be made to the wires and cables fitted to the interior of the conduits, the exterior surfaces of the conduit box being rigidly supported by the concrete wall, which also supports the individual conduits, the ends of which are supported by the vertical outer walls of the conduit box.

Another feature of the construction, is that a rim integral with the lower plastic cover is fixedly attached to a pair of flanges integral with the vertical side walls of the conduit box, the flanges integral with the open lower ends of the vertical walls of the conduit box being inserted through slots formed in the rim of the protective cover, thus gripping the cover before the flanges integral with the open lower end of the conduit box, are attached to the portion of the wooden or other type of concrete form to which the conduit box is attached before the concrete is poured around the outer surfaces of the conduit box.

Another feature of the construction is that the bottom wall of the protective cover is rigidly clamped between the bottom face of the open end of the vertical walls of the conduit box, the flanges integral with the vertical walls of the conduit box, and the portion of the wooden form to which the flanges at the lower end of the conduit box are rigidly attached, before the concrete is poured, thus rigidly supporting the conduit box in the form during the process of pouring the concrete around the outer surfaces of the conduit box.

Another feature of the construction is that another protective plastic cover may be fitted around, and held rigidly against the flat top plate attached to the conduit box, thereby protecting the upper portion of the box, and closing any openings which may be formed therein while the concrete is being poured around the outer walls and the other outer surfaces of the conduit box, thus protecting the top plate, which is attached to the upper end of the vertical walls of the conduit box, and preventing fluid concrete from running through the top plate, and into the upper portion of the conduit box, during the process of pouring concrete around the outer surfaces of the vertical walls of the conduit box, and the top plate attached thereto.

Due to the fact that the upper protective cover remains attached to the top plate of the conduit box, after the concrete is poured around the top plate of the conduit box, the upper protective cover remains imbedded in the concrete ceiling or wall, so that it is not necessary to remove the upper protective cover from the top plate attached to the conduit box, after the concrete is poured and hardens, the flat top wall of the cover being held between the inner surface of the concrete, after hardening, and the surface of the top plate of the conduit box, to which the plastic upper cover is attached.

The vertical walls of the conduit box may follow an octagonal, or other regular polygonal pattern, or they may be of substantially circular form, depending upon the number of conduits, the ends of which are inserted in and supported by the vertical walls of the conduit box, and the relative positions of the conduits, the ends of which are attached to the vertical walls of the conduit box.

The accompanying drawings, illustrative of one embodiment of the invention, and one modification thereof, together with the description of their construction and the method of operation, mounting and utilization thereof, will serve to clarify further objects and advantages of the invention.

In the drawings:

FIG. 1 is a vertical section through one embodiment of the outlet conduit box, showing the bottom protective cover in place on the open end of the conduit box and an upper protective cover fitted to the top plate of the conduit box, the entire outer portion of the conduit box being imbedded in concrete.

FIG. 2 is a cross-section through the conduit box shown in FIG. 1, with the concrete removed, showing the vertical walls of the box, and the rim of the bottom cover fitted to the vertical outer walls of the box, and the flanges integral therewith, the section being taken on the line 2—2, FIG. 1.

FIG. 3 is a vertical section, similar to FIG. 1, through a modification of the outlet conduit box shown in FIG. 1, the outer wall of the box being of circular cross-section, showing the protective cover fitted to the open lower end of the conduit box, and the flanges integral with the vertical walls of the box, inserted through the rim of the bottom cover, also showing the tubular conduits attached to the vertical outer wall of the box.

FIG. 4 is a partial cross-section and partial plan view of the conduit box shown in FIG. 3, showing the rim of the bottom cover attached to the open lower end of the conduit box, also showing an upper cover fitted to the top plate of the conduit box, the section being taken on the line 4—4, FIG. 3.

FIG. 5 is a vertical section through the lower protective cover, used in conjunction with the outlet conduit box shown in FIGS. 1 and 2, showing the slot through the junction between the rim, and the bottom wall of the cover, the section being taken on the line 5—5, FIG. 6.

FIG. 6 is a plan view of the lower protective cover shown in FIGS. 1 and 5, showing the contour of the rim of the cover.

FIG. 7 is a side elevational view of a portion of the protective cover, shown in FIGS. 5 and 6, showing the rectangular slot through one section of the rim of the bottom cover, through which one of the flanges shown in FIG. 1 is inserted, the view being taken on the line 7—7, FIG. 6.

It will be understood that the following description of the construction and the method of operation, mounting and utilization of the removable protective cover for conduit box, is intended as explanatory of the invention and not restrictive thereof.

In the drawings, the same reference numerals designate the same parts throughout the various views, except where otherwise indicated.

One embodiment of the outlet conduit box shown in FIGS. 1 and 2, comprises a hollow open-ended box 10, formed of relatively thin sheet material, the cross-section of the box being of octagonal, or of other suitable regular polygonal cross-sectional contour, the octagonal box including eight vertical wall sections 12, 12a, 12b, as shown in FIG. 2.

As shown in FIG. 2, the vertical wall sections of the box are formed in two blank sections 13, 14, each blank section forming one half of the box.

The end wall sections at the left-hand end of the box shown in FIG. 2, are each formed in two sections, including an outer section 16, which is integral with one section of the vertical walls of the box and forms the outer section of one end wall section, and an inner end wall section 17, which is located adjacent the outer end wall section 16 and attached thereto by spot-welding, or other suitable attaching means.

Similarly, the right-hand end wall section of the box is also formed in two sections including an outer section 18, integral with one section 14 of the blank of the box and an inner end wall section 19, integral with the opposite section 13 of the blank of the vertical walls of the box, the inner end wall section being located adjacent and fixedly attached to the outer end wall section 18 to form the right-hand end wall section of the box.

The inner and outer end wall sections 16, 17 and 18, 19 of the box overlap one another, as shown in FIG. 2, to form the right and left-hand end wall sections of the box.

The lower end of the conduit box shown in FIGS. 1 and 2 is open.

The two extreme outer end wall sections 16 and 18 each has a bottom flange 21, 22, of rectangular or other suitable contour integral with the lower end thereof, the flanges being substantially perpendicular to the end wall sections 16, 18 and nominally aligned with the open end of the bottom face of the box.

Each of the flanges 21, 22 has a central opening 23 therethrough, as shown in FIGS. 1 and 2, the flanges being provided to attach the conduit box to a portion of the wooden or other type of form, which is used to control the contour of the concrete poured around the box.

As shown in FIG. 1, each of the flanges 21, 22 is attached to the bottom section 24 of the concrete form, a nail 25, 25a being inserted through the opening 23, in each of the flanges 21, 22 to rigidly fasten the flanges 21, 22 to the bottom section 24 of the form, where the form is made of wood, or a similar material.

Where metal concrete forms are used, in place of wood forms, the flanges 21, 22 may be attached to the bottom section of the form, by bolts, screws, or other suitable attaching means.

The protective cover 26, which is fitted to the open bottom face of the box shown in FIGS. 1 and 2, is shown in detail in FIGS. 5, 6 and 7. This protective cover, which is formed of a relatively thin plastic material, consists of a flat bottom wall 27, of octagonal, or other suitable contour, and a rim of octagonal sectional form, the rim sections 28, 28a and 29, 29a being located adjacent and accurately fitted to the vertical wall sections 12, 12a of the open lower end of the conduit box, to cover the open end of the vertical wall sections of the conduit box, and prevent the entrance of foreign material, such as fluid concrete into the open end of the conduit box, when the concrete vertical wall 30, 30a, and the concrete top wall 31, both of which form parts of a ceiling, or wall of a building, are poured around the outer surface of the walls of the conduit box, and the top plate attached to the conduit box in the manner shown in FIG. 1.

The two end sections 28, 29 of the rim of the lower protective cover each has a rectangular slot 32, 33 therethrough adjacent the closed bottom wall 27 of the cover, as shown in FIGS. 5 and 7. These slots 32, 33 allow the flanges 21, 22 integral with the vertical end sections 16, 18 of the walls of the conduit box to be inserted therethrough into the position shown in FIG. 1, thus allowing the flanges 21, 22 to be attached to the bottom section 24, of the concrete form in the manner shown in FIG. 1, thereby clamping the bottom wall of the protective cover 26 between the flanges 21, 22 and the bottom section 24 of the concrete form in the manner shown in FIG. 1.

After the concrete is poured around the outer surfaces of the conduit box, as shown in FIG. 1 and the concrete hardens, the bottom section 24 of the concrete form, and the other sections of the form attached thereto, are removed. The bottom wall 27 of the bottom cover 26, which is fitted to the open bottom face of the conduit box, is removed by cutting out the bottom wall of the cover along a line following the regular polygonal contour of the inner surface of the vertical wall sections of the conduit box, by means of a knife, or other suitable cutting means, to clear the interior of the conduit box.

The bottom wall of the bottom cover may have a score line molded or otherwise formed into the bottom or outer surface thereof, the score line following the regular polygonal contour of the inner surfaces of the vertical wall sections of the conduit box, to facilitate removal or cutting out of the bottom wall of the cover after the concrete has hardened.

The cover instead of being molded or otherwise formed as a separate piece can be moulded around the bottom of the walls of the conduit box by suitable means. The box can be preheated and forced into a flat sheet of plastic material, the plastic material being forced around and adhering to the outer surfaces of the conduit box, and thereby being fixedly attached thereto, the flat bottom wall of the cover being essentially the same as that shown in FIG. 1.

The plastic material of which the bottom cover is made is flexible to facilitate gripping the outer wall sections of the conduit box. If the conduit box should loosen from the concrete form, for any reason, the bottom cover 26 remains attached to the open lower end of the box, thus protecting the open lower end of the conduit box from the fluid concrete.

Each section of the vertical outer wall of the conduit box has an opening 34, 34a, 35, 35a therethrough, as shown in FIG. 1, a tubular conduit 36, 36a, 37, 37a, being inserted in each of the openings and fixedly attached to the vertical wall section of the conduit box, in the manner shown in FIG. 1.

The outer end of each of the conduits, which is inserted through the opening in the vertical wall section of the conduit box may be externally threaded. A lock nut 70 threadably fitted to the externally threaded wall of the conduit would be fitted to the conduit adjacent the outer surface of the adjacent vertical wall section of the conduit box to clamp the conduit to the wall section of the conduit box. An internally threaded bushing 71 would be fitted to the extreme end of each conduit projecting through the wall section of the conduit box, the bushing having an annular groove 72 therein to fit over the projecting end of the conduit, thereby protecting the section of the conduit projecting beyond the inner surface of the vertical wall section of the conduit box. The lock nut 70 and the bushing 71 clamp and fixedly attach the conduit to the adjacent vertical wall section of the conduit box.

Where no conduits are fitted to any of the openings 34, 35 through the vertical wall sections 12, 12a of the conduit box, a thin circular plug is inserted in each of the openings and removably attached thereto, to seal the openings.

The openings 34, 35 through the vertical wall 12, 12a of the conduit box may be of equal diameter and spacing as shown in FIG. 1, or they may be varied in size and spacing, depending upon the requirements of a particular installation.

As shown in FIG. 1, the upper end of the left-hand outer wall section 16 of the conduit box and the upper end of the opposite or right-hand outer wall section 18 of the conduit box, each has a flat flange 38, 39 integral therewith, the upper flanges being substantially perpendicular to the adjacent vertical wall sections, and nominally aligned with the open upper end of the wall sections 12, 12a of the conduit box.

Each of the upper flanges 38, 39 has an internally-threaded opening therethrough as shown in FIG. 1.

A top plate 41, of circular or other suitable contour, is mounted at the upper end of the vertical wall sections 12, 12a of the conduit box, the top plate being removably attached to the upper flanges 38, 39 integral with the vertical wall sections of the conduit box by a pair of screws 40, 40a, each of the screws being threadably fitted to the internally threaded opening in one of the top flanges 38, 39.

In order to protect the top plate 41 of the conduit box from the fluid concrete, a protective top cover 42, similar to the lower protective cover 26 is fitted to the top plate 41 attached to the conduit box. The top cover which is formed of a thin plastic material, includes a top wall 43, of circular, or other suitable contour following the contour of the top plate 41, and a rim 44, which is integral with the top wall 43 and substantially perpendicular thereto, the rim being wrapped around the top plate 41 of the box, the open lower section 45 of the rim being folded around the outer circumference of the top plate 41, to grip the top plate and attach the protective top cover 42 to the top plate in the manner shown in FIG. 1, in order to protect the top plate 41 from the top section 31 of the concrete which is poured above the top wall of the cover 42, thereby separating the top plate 41 of the conduit box from the inner surface of the concrete ceiling or wall.

As shown in FIG. 1, the top wall 42 of each of the covers is displaced along an arcuate section at the point where it covers the head 46 of each of the screws attaching the top plate 41 of the conduit box to the flanges 21, 22 integral with the wall sections 16, 18 of the conduit box 10, to clear the heads of the screws 41, 41a.

FIGS. 3 and 4 show a modification of the conduit box construction shown in FIGS. 1 and 2.

This outlet conduit box 48 is essentially the same as that shown in FIGS. 1 and 2, except that the vertical wall 49 of the conduit box is of substantially circular cross-section, as shown in FIG. 4.

The lower end of the outer wall 49 of the conduit box is open in the same manner as that shown in FIG. 1.

The lower end of the outer wall of the conduit box has a pair of flanges 50, integral therewith, the flanges being substantially perpendicular to the vertical wall of the conduit box and aligned with the open lower end of the conduit box.

Each of the lower flanges 50, has a central opening 51 therethrough in the same manner as that shown in FIG. 1, the openings being used to attach the lower flanges 50 to the lower section of the form of the concrete ceiling or wall in the same manner as that shown in FIG. 1.

The protective cover 52 which is made of a thin plastic material, includes a relatively short rim 54, integral with the bottom wall, the rim being substantially perpendicular to the bottom wall of the cover. The sides of the rim 54 of the cover have a pair of substantially rectangular slots 47 therethrough, in the same manner as those shown in FIGS. 5 and 7, the slots clearing the two lower flanges 50, when the lower cover is assembled to the conduit box in the position shown in FIG. 3.

As shown in FIGS. 3 and 4, the outer wall 49 of the conduit box has a plurality of substantially circular openings 55, 55a, 56, 56a therethrough, the openings being generally equally-spaced around the outer circumference of the vertical wall.

The openings through the vertical wall 49 of the conduit box may be of equal diameter and equally spaced, or the diameter of the openings, and the radial spacing therebetween may be varied, depending upon the requirements of a particular installation.

Each of the openings through the vertical wall of the conduit box, has a tubular conduit 57, 57a, 57b inserted therethrough, as shown in FIGS. 3 and 4. The outer end of each of the conduits 57, 57a, which is inserted through the opening in the vertical wall section of the conduit box may be externally threaded in the same manner as that shown in FIG. 1. A lock nut 70a threadably fitted to the externally threaded wall of the conduit would be fitted to the conduit, adjacent the outer surface of the wall of the conduit box, an internally threaded bushing 71a would be fitted to the extreme inner end of each conduit projecting through the vertical wall of the conduit box, the bushing having an annular groove 72a therein, to fit over the end of the conduit, thereby protecting the section of each conduit projecting beyond the inner surface of the vertical wall of the conduit box. The lock nut 70a, and the bushing 71a clamp and fixedly attach the conduit to the adjacent vertical wall of the conduit box.

In the openings 56, which have no conduits inserted therein, such as the front and rear openings 56, shown in FIGS. 3 and 4, a flat plug, or other insert, of circular contour, is inserted in each of the openings, as shown in the center of FIG. 3, the plugs being operative to seal the openings and prevent the concrete, when poured, from entering the conduit box through the openings 56, 56a.

As shown in FIG. 4, the outer wall of the box may be formed of a single sheet or strip of steel, or a similar material, one end 58 of the vertical outer wall of the box being offset, as shown in FIG. 4, to receive the opposite end 59 of the circumferential wall which is of circular segmental contour, following the contour of the balance of the vertical wall.

As shown in FIG. 3, the sides of the upper end of the outer wall of the conduit box, each has a flat flange 60, 60a of rectangular contour integral therewith, the flanges being substantially perpendicular to the vertical axis of the conduit box, and nominally aligned with the top of the vertical wall 49 of the conduit box. Each of the upper flanges 60 has an internally threaded central opening 62 therethrough, each opening being adapted to receive the body of a screw 63, 63a, which is used to attach the flanges of the conduit box to a top plate 64, which is located above the open upper end of the vertical wall 49 of the conduit box in substantially the position shown in FIG. 3.

As shown in FIGS. 3 and 4, the top plate 64 of the conduit box, is of circular contour following the contour of the outer wall of the conduit box, the outer circumference of the top plate projecting beyond the outer circumference of the vertical outer wall 49 of the conduit box.

A top cover 65, similar to that shown in FIG. 1 is fitted to the top plate 64 of the conduit box shown in FIG. 3. The top cover 65 which is formed of a thin plastic material includes a top wall 66, of circular contour, following the contour of the top plate 64, and a narrow rim 67 integral with the top wall, and substantially perpendicular thereto, the open lower section 68 of the rim being folded around the outer circumference of the top plate 64 of the conduit box in the same manner as that shown in FIG. 1.

The sides of the top wall 66 of the cover 65 are displaced along an arcuate line in the same manner as those shown in FIG. 1, to clear the round head 69 of each of the screws, which are used to attach the top plate to the flanges integral with the outer wall of the conduit box.

The conduit box 48 is attached to the bottom wall of the form used for pouring concrete around the outer portion of the conduit box shown in FIG. 3, the wall forming part of the ceiling, or wall of a building, the same manner as that shown in FIG. 1.

The concrete poured around the conduit box includes a top section covering the top plates 64 of the conduit box and the top cover 65 fitted thereto, and a vertical wall section of circular interior cross-section fitted to the outer circumference of the vertical outer wall 49 of the conduit box, both concrete sections forming part of the ceiling or wall of a building.

The vertical wall section of concrete surrounding the vertical outer wall 49 of the conduit box which forms part of the ceiling, or wall of a building, supports the sections of the tubular conduit 57, 57a in substantially the same manner as that shown in FIG. 1.

After the concrete is poured and it hardens, the bottom section 24 of the form and the other sections of the form attached thereto, are removed, the bottom wall of the bottom cover 52, which is fitted to the open bottom face of the conduit box is cut out by means of a knife, or other suitable means to clear the interior of the open end of the conduit box, and allow wires or cables to be attached to the wires or cables passing through the open ends of the conduits 36, 37 supported by the conduit box 10, in the same manner as that shown in FIG. 1.

The bottom wall of the cover may have a score line molded or otherwise formed into the bottom surface thereof, the score line following the contour of the inner surface of the vertical wall of the conduit box, to facilitate removal or cutting out of the bottom wall of the cover after the concrete has hardened.

The number of conduits inserted in and supported by a circular conduit box, such as that shown in FIG. 4, would depend upon the number, diameter and spacing of the conduits required in a particular installation.

The number and size of the openings 55, 55a, 56, 56a through the vertical outer wall 49 of the conduit box would depend upon the normal number and size of the conduits with which the conduit box 48 is used.

Any openings through the vertical outer wall of the conduit box, which do not have conduit fitted thereto, would have circular plugs inserted therein, in the same manner as that shown in the front and rear faces of the vertical outer wall shown in FIG. 3.

While the conduit box shown in FIGS. 1 and 2, is of octagonal cross-sectional contour, this cross-section may be made hexagonal, or of other regular polygonal cross-section, the cross-sectional contour depending upon the number of conduits to be fitted to and supported by each conduit box.

Where the diameter and location of the individual conduits vary relative to one another, the width and spacing of the section 12, 12a of the vertical wall of the conduit box may be varied to suit the requirements of a particular installation.

In some instances in which conduits, similar to those shown inserted in the vertical outer wall of the conduit box as shown in FIG. 3, are fitted to the top plate 41 of the conduit box, the top wall of the plastic top cover may be cut at various points to clear the outer diameter of the conduits inserted through and supported by the top plates of the conduit box.

This applies to the top plate 41 of the conduit box construction shown in FIG. 1, or the top plate 64 of the modified conduit box construction shown in FIGS. 3 and 4.

The method of attaching the top plates 41, 64 of the conduit box to the flanges at the top of the conduit box may be as shown in FIGS. 1 and 3, or another method of attaching the top plate to the conduits box may be substituted therefor.

The bottom cover shown in FIGS. 1, 5, 6 and 7 may be formed of thin-walled sheet plastic material, or the bottom cover may be moulded of a plastic material, depending upon the plastic material used, the size and cross-sectional contour of the conduit box, and the thickness of the plastic material used in a particular cover.

The bottom cover instead of being molded as a separate piece can be moulded around the bottom of the walls of the conduit box by suitable means. The conduit box can be preheated and forced into a flat sheet of plastic material, the plastic material being forced around and adhering to the outer surfaces of the conduit box, and thereby being fixedly attached thereto, the flat bottom wall of the bottom cover being essentially the same as that shown in FIG. 1.

This also applies to the top covers shown in FIGS. 1 and 3, and the modified bottom cover shown in FIG. 3.

It will be apparent to those skilled in the art that the present invention is not limited to the specific details described above and shown in the drawings, and that various modifications are possible in carrying out the features of the invention and the operation, and the method of attaching, supporting and utilization thereof, without departing from the spirit and scope of the appended claims.

What I claim is:

1. In combination with an outlet conduit box, said conduit box consisting of a hollow box formed of a plurality of vertical wall sections located along a regular polygonal cross-sectional contour, each of the vertical wall sections of the conduit box having a substantially circular opening therethrough, each of said openings being adapted to receive a portion of a substantially tubular conduit therethrough, the side sections of said vertical wall sections having means integral with one end thereof for supporting the conduit box, a protective cover fitted to the open end of said conduit box, said protective cover consisting of a substantially flat base wall following the outer contour of the vertical wall sections of the conduit box, and a relatively thin rim substantially perpendicular to the base wall, the inner surface of said thin rim following substantially the cross-sectional contour of the outer surface of the vertical wall sections of the conduit box, the protective cover being made of a thin-walled plastic material of a high degree of flexibility, to enable said protective cover to be fitted to the open end of the conduit box, over the support means integral with the vertical wall sections of the conduit box.

2. In combination with an outlet conduit box, said conduit box consisting of a hollow box formed of a plurality of vertical wall sections located along a regular polygonal cross-sectional contour, each of the vertical wall sections of the conduit box having a substantially circular opening therethrough, each of said openings being adapted to receive a portion of a substantially tubular conduit therethrough, the side sections of said vertical wall sections having means integral with one end thereof for supporting the conduit box, a protective cover fitted to the open end of said conduit box, said protective cover consisting of a substantially flat base wall following the outer contour of the vertical wall sections of the conduit box, and a relatively thin rim substantially perpendicular to the base wall, the inner surface of said thin rim following substantially the cross-sectional contour of the outer surface of the vertical wall sections of the conduit box, the means integral with the side sections of the vertical wall sections of the conduit box for supporting the conduit box, including a plurality of flanges integral with adjacent vertical wall sections of the conduit box, said flanges being substantially perpendicular to the adjacent vertical wall sections of the conduit box, the sections of the rim of the protective cover located near said flanges each having a slot therethrough, each of said slots being adapted to clear one of the flanges integral with a vertical wall section of the conduit box, thereby to enable the rim of the protective cover to be fitted to the outer surfaces of the vertical wall sections of the conduit box, the protective covering being made of a thin-walled plastic material of a high degree of flexibility to enable said protective cover to be fitted to the open end of the conduit box, over the flanges.

3. In combination with an outlet conduit box, said conduit box consisting of a hollow box of regular polygonal cross-sectional contour said conduit box being formed of a plurality of vertical wall sections, said vertical wall sections following the regular polygonal cross-sectional contour of the conduit box, each of the vertical wall sections of the conduit box having a substantially circular opening therethrough, each of said openings being adapted to receive one end of a substantially tubular conduit therethrough, the side sections of said vertical wall sections, each having a first support means integral therewith for supporting the conduit box, the side sections of the vertical wall sections of the conduit box, opposite the first support means having a second support means integral therewith, the second support means being substantially perpendicular to the adjacent vertical wall sections of the conduit box, a thin-walled cover plate fitted to the end of the conduit box adjacent the second support means, means attaching the thin-walled cover plate to the second support means, a protective cover fitted to the end of the conduit box adjacent the cover plate, said protective cover consisting of a base wall located in substantial alignment with the outer surface of the cover plate, the outer contour of said base wall following substantially the outer contour of the cover plate, a rim integral with the base wall of the protective cover, the inner contour of said rim following substantially the outer contour of the cover plate, said protective cover being removably attached to the cover plate, the means integral with one end of the side sections of the vertical wall sections of the conduit box including a plurality of flanges integral with the adjacent vertical side wall sections of the conduit box, said flanges being substantially perpendicular to the adjacent vertical wall sections of the conduit box, the side sections of the vertical wall sections of the conduit box, opposite the cover plate, each having means integral therewith for supporting the conduit box, a second protective cover fitted to the open end of the conduit box opposite the cover plate, said second protective cover consisting of a substantially flat base wall following the outer contour of the vertical wall sections of the conduit box, and a relatively thin rim substantially perpendicular to the base wall, the inner surface of said thin rim following substantially the cross-sectional contour of the outer surface of the vertical wall sections, said thin rim having means formed therein adapted to clear the first support means integral with the vertical wall sections of the conduit box, and means for attaching the first support means integral with the vertical wall sections of the conduit box to a section of a concrete form, to clamp the base wall of the second protective cover between the section of the concrete form and the adjacent end of the vertical wall sections of the conduit box.

4. In combination with an outlet conduit box, said conduit box consisting of a hollow box of substantially circular cross-sectional contour, the vertical wall of the conduit box having a plurality of substantially circular openings therethrough, each of said openings being adapted to receive one end of a substantially tubular conduit, said vertical wall having a first support means integral with one end thereof, for supporting the conduit box, a protective cover fitted to the open end of the conduit box, said protective cover consisting of a substantially flat base wall following substantially the outer contour of the vertical wall of the conduit box, and a relatively thin rim following substantially the cross-sectional contour of the outer surface of the vertical wall, the first support means integral with the vertical wall of the conduit box including a plurality of flanges integral with side portions of the vertical wall of the conduit box, the sections of the rim of the protective cover located near said flanges, each having a slot therethrough, each of said slots being adapted to clear one of the flanges integral with the vertical wall of the conduit box, to enable the rim of the protective cover to be fitted to the outer surface of the vertical wall of the conduit box, over the flanges.

5. In combination with an outlet conduit box, said conduit box consisting of a hollow box of substantially circular cross-sectional contour, the vertical wall of the conduit box having a plurality of substantially circular openings therethrough, each of said openings being adapted to receive one end of a substantially tubular conduit, said vertical wall having a first support means integral with one end thereof, for supporting the conduit box, a protective cover fitted to the open end of the conduit box, said protective cover consisting of a substantially flat base wall following substantially the outer contour of the vertical wall of the conduit box, and a relatively thin rim substantially perpendicular to the base wall, the inner surface of said thin rim following substantially the cross-sectional contour of the outer surface of the vertical wall, the first support means integral with the side portions of the vertical wall of the conduit box, including a plurality of flanges integral with the vertical wall of the conduit box, each of said flanges being substantially perpendicular to the adjacent portion of the vertical wall of the conduit box, the portions of the rim of the protective cover located near said flanges, each having a slot therethrough, said slots being adapted to clear one of the flanges integral with the vertical wall of the conduit box, to enable the rim of the protective cover to be fitted to the outer surface of the vertical wall of the conduit box, over the flanges, the protective cover being made of a thin-walled plastic material of a high degree of flexibility to enable said protective cover to be fitted to the vertical wall surrounding the open end of the conduit box, over the flanges.

6. In combination with an outlet conduit box, said conduit box consisting of a hollow box of substantially circular cross-sectional contour, the vertical wall of the conduit box having a plurality of substantially circular openings therethrough, each of said openings being adapted to receive one end of a substantially tubular conduit, said vertical wall having a first support means integral with one end thereof, for supporting the conduit box, a protective cover fitted to the open end of the conduit box, said protective covering consisting of a substantially flat base wall following substantially the outer contour of the vertical wall of the conduit box, and a relatively thin rim following substantially the cross-sectional contour of the outer surface of the vertical wall, the vertical wall of the conduit box, opposite the first support means, having a second support means integral therewith, the second support means being substantially perpendicular to the adjacent portion of the vertical wall of the conduit box, a thin-walled cover plate fitted to the end of the conduit box adjacent the second support means, means attaching the thin-walled cover plate to the second support means, a protective cover fitted to the end of the conduit box, adjacent the cover plate, said protective cover consisting of a base wall located in substantial alignment with the outer surface of the cover plate, the outer contour of the base wall following substantially the outer contour of the cover plate, a rim integral with the base wall of the protective cover, the inner contour of the rim following substantially the outer contour of the cover plate, said protective cover being removably attached to the cover plate, the protective cover being made of a thin-walled plastic material of a high degree of flexibility, the rim of the protective cover being fitted to the outer perimeter of the cover plate, the projecting portion of the rim of the protective cover being bent angularly inward relative to the outer perimeter of the cover plate, thereby to grip the cover plate.

7. In combination with an outlet conduit box, said conduit box, consisting of a hollow box formed of a plurality of vertical wall sections located along a regular polygonal cross-sectional contour, each of the vertical wall sections of the conduit box having a substantially circular opening therethrough, each of said openings being adapted to receive a portion of a substantially tubular conduit therethrough, the side sections of said vertical wall sections having means integral with one end thereof for supporting the conduit box, a protective cover fitted to the open end of said conduit box, said protective cover consisting of a substantially flat base wall following the outer contour of the vertical wall sections of the conduit box, and a relatively thin rim substantially perpendicuar to the base wall, the inner surface of said thin rim following substantially the cross-sectional contour of the outer surfaces of the vertical wall sections of the conduit box, the means integral with the side sections of the vertical wall sections of the conduit box including a plurality of flanges integral with the adjacent vertical wall sections of the conduit box, said flanges being substantially perpendicular to the adjacent vertical wall sections of the conduit box, the sections of the rim of the protective cover located near said flanges, each having a slot therethrough, each of said slots being adapted to clear one of the flanges integral with a vertical wall section of the conduit box to enable the rim of the cover to be fitted to the outer surfaces of the vertical wall sections of the conduit box, over the flanges, the protective cover being made of a thin-walled plastic material of a high degree of flexibility, to enable said protective cover to be fitted to the open end of the conduit box, over the flanges.

8. In combination with an outlet conduit box, said conduit box consisting of a hollow box formed of a plurality of vertical wall sections located along a regular polygonal cross-sectional contour, each of the vertical wall sections of the conduit box having a substantially circular opening therethrough, each of said openings being adapted to receive a portion of a substantially tubular conduit therethrough, the side sections of said vertical wall sections having means integral with one end thereof for supporting the conduit box, a protective cover fitted to the open end of said conduit box, said protective cover consisting of a supstantially flat base wall following the outer contour of the vertical wall sections of the conduit box, and a relatively thin rim substantially perpendicular to the base wall, the inner surface of said thin rim following substantially the cross-sectional contour of the outer surfaces of the vertical wall sections of the conduit box, means attaching the support means integral with one end of the vertical wall sections of the conduit box to a section of concrete form, located in substantial alignment with the outer surface of the base wall of the protective cover, to clamp the base wall of the protective cover between the section of the concrete form, and one end of the vertical wall sections of the conduit box, the protective cover being made of a thin-walled plastic material of a high degree of flexibility, to enable said protective cover to be fitted to the open end of the conduit box, over the support means integral with the vertical wall sections of the conduit box.

9. In combination with an outlet conduit box, said conduit box consisting of a hollow box of regular polygonal cross-sectional contour, said conduit box being formed of a plurality of vertical wall sections, said vertical wall sections following the regular polygonal cross-sectional contour of the conduit box, each of the vertical wall sections of the conduit box having a substantially circular opening therethrough, each of said openings being adapted to receive one end of a substantially tubular conduit therethrough, the side sections of said vertical wall sections, each having a first support means integral therewith for supporting the conduit box, the side sections of said vertical wall sections, each having a first support means integral therewith for supporting the conduit box, the side sections of the vertical wall sections of the conduit box, opposite the first support means having a second support means integral therewith, the second support means being substantially perpendicular to the adjacent vertical wall sections of conduit box, a thin-walled cover plate fitted to the end of the conduit box adjacent the cover plate, said protective cover consisting of a base wall located in substantial alignment with the outer surface of the cover plate, the outer contour of said base wall following substantially the outer contour of the cover plate, a rim integral with the base wall of the protective cover, the inner contour of said rim following substantially the outer contour of the cover plate, said protective cover being removably attached to the cover plate, the means integral with one of the side sections of the vertical wall sections including a plurality of flanges integral with the adjacent vertical side wall sections of the conduit box, said flanges being substantially perpendicular, the side sections of the vertical wall sections of the conduit box, opposite the cover plate, each having means integral therewith for supporting the conduit box, the protective cover being made of a thin-walled plastic material, of a high degree of flexibility, the rim of said protective cover being fitted to the outer perimeter of the cover plate attached to the conduit box, the inner surface of the rim of the protective cover being bent angularly inward relative to the outer perimeter of the cover plate thereby to grip the cover plate, and means for attaching the first support member integral with the vertical wall sections of the conduit box to a section of the connect form, to clamp the protective cover between the section of the concrete form and the adjacent vertical wall sections of the conduit box.

References Cited in the file of this patent

UNITED STATES PATENTS

| | | |
|---|---|---|
| 1,099,986 | Lutz et al. | June 16, 1914 |
| 1,934,300 | Fullman | Nov. 7, 1933 |
| 2,804,116 | Van Niel et al. | Aug. 27, 1957 |
| 2,833,324 | Burroughs | May 6, 1958 |
| 2,983,399 | Slater et al. | May 9, 1961 |